United States Patent
Brock et al.

(10) Patent No.: US 11,204,273 B2
(45) Date of Patent: Dec. 21, 2021

(54) VIBRATION SENSOR

(71) Applicant: PIETRO FIORENTINI S.P.A., Arcugnano (IT)

(72) Inventors: Martin Edward Brock, Cambridge (GB); Jose Pablo Puga, Santiago (CL)

(73) Assignee: Pietro Fiorentini S.P.A., Arcugnano (IT)

( * ) Notice: Subject to any disclaimer, the term of this patent is extended or adjusted under 35 U.S.C. 154(b) by 445 days.

(21) Appl. No.: 16/095,243

(22) PCT Filed: Apr. 21, 2017

(86) PCT No.: PCT/IB2017/052306
§ 371 (c)(1),
(2) Date: Oct. 19, 2018

(87) PCT Pub. No.: WO2017/182994
PCT Pub. Date: Oct. 26, 2017

(65) Prior Publication Data
US 2020/0355546 A1    Nov. 12, 2020

(30) Foreign Application Priority Data
Apr. 21, 2016  (IT) .................. 102016000041439

(51) Int. Cl.
*G01H 9/00* (2006.01)
*G01V 1/18* (2006.01)

(52) U.S. Cl.
CPC ............. *G01H 9/004* (2013.01); *G01V 1/181* (2013.01); *G01V 1/186* (2013.01)

(58) Field of Classification Search
CPC ........ G01H 9/004; G01V 1/181; G01V 1/186; G01V 1/52; G01V 1/40; G01V 1/18; G01V 2210/1429

(Continued)

(56) References Cited

U.S. PATENT DOCUMENTS 4,893,930 A * 1/1990 Garrett .................. G01H 9/004
                                                         250/227.19
5,317,929 A   6/1994 Brown et al.
(Continued)

FOREIGN PATENT DOCUMENTS

| JP | 2001-281347 A | 10/2001 |
| WO | 2001/25800 A3 | 4/2001 |
| WO | 2001/025800 A3 | 4/2001 |

OTHER PUBLICATIONS

International Search Report and Written Opinion dated Sep. 14, 2017, issued in PCT Application No. PCT/IB2017/052306, filed Apr. 21, 2017.

*Primary Examiner* — Tarun Sinha
(74) *Attorney, Agent, or Firm* — Workman Nydegger

(57) ABSTRACT

A vibration sensor includes: a supporting structure provided with a cavity; a proof mass accommodated in the cavity; a plurality of elastic bodies, each connecting the proof mass to the supporting structure along a corresponding connection axis; an optical fibre portion arranged in contact with each elastic body and wound around the corresponding connection axis. The proof mass has an elongated shape according to a main reference direction (Z), and the plurality of elastic bodies comprises two or more first elastic bodies which are spaced along the main reference direction (Z) and are arranged so that they are all caused to be simultaneously compressed along their corresponding connection axes following a displacement of the proof mass in a first reference direction (X) perpendicular to the main reference direction (Z), and simultaneously stretched along their corresponding connection axes following a displacement of the proof mass in a direction opposite the first reference direction.

23 Claims, 6 Drawing Sheets

(58) Field of Classification Search
USPC .............................. 73/653, 514.24, 514.38
See application file for complete search history.

(56) References Cited

U.S. PATENT DOCUMENTS

| | | | |
|---|---|---|---|
| 5,996,416 A | 12/1999 | Eguchi | |
| 2005/0126287 A1* | 6/2005 | Malametz | G01P 15/18 |
| | | | 73/504.12 |
| 2006/0174709 A1* | 8/2006 | Hobbs | G01M 7/022 |
| | | | 73/649 |

* cited by examiner

VIBRATION SENSOR

CROSS-REFERENCE TO RELATED APPLICATIONS

This application is a US nationalization of PCT/IB2017/052306, filed Apr. 21, 2017, which claims priority to Italian Application No. 102016000041439, filed Apr. 21, 2016, which are incorporated herein by specific reference.

BACKGROUND OF THE INVENTION

1. The Field of the Invention

The present invention concerns a vibration sensor, in particular a geophone or a hydrophone.

2. The Relevant Technology

As is known, geophones and hydrophones are sensors that make it possible to detect the acoustic or seismic vibrations that propagate underground or underwater, respectively, converting them into electric or optical signals suited to be sent to a processing system in order to be analysed.

In general, a vibration sensor of the known type comprises a supporting structure with a proof mass suspended from it.

In the case of geophones, the supporting structure is buried in the ground so that it vibrates integrally with the ground. Due to the inertia of the proof mass, which tends to preserve its position in space, the vibrations of the supporting structure are converted into corresponding movements of the proof mass with respect to the supporting structure itself, the amplitude of these movements being proportional to the component of the vibration.

According to a known variant embodiment, said vibration sensors are configured in such a way as to detect vibrations that propagate in any direction in space. These sensors are called "vector" or "triaxial" or "three-component" sensors, as they make it possible to detect the components of a vibration according to three independent axes.

The main advantage of a vector sensor is to allow measuring, together with the amplitude of vibration signal, also its angle of arrival.

More specifically, a vector sensor is capable to separately detect the vibration components along the three axes, by rendering each axis as unresponsive as possible to vibration signals directed orthogonal to that axis. This feature is called "cross-axis rejection". Obviously, a high cross-axis rejection results in higher measurement fidelity of the sensor, since it implies less interference among the different axes.

According to a known embodiment, a vector vibration sensor is constituted by a supporting structure provided with a cavity in which there is a substantially spherical proof mass or, in any case, a proof mass having substantially the same dimensions along the three axes. The proof mass is maintained suspended from the supporting structure by means of three pairs of cylindrical bodies made of rubber, each pair being aligned according to a respective axis and being arranged on the two opposite sides of the proof mass. An optical fibre is wound around each cylindrical body and forms a sort of coil.

The vibrations of the supporting structure resulting from a vibration signal in the ground results in a succession of compression and elongation deformations of the cylindrical bodies according to the respective axes, the amplitude of said compression and elongation deformations being proportional to the component of the vibration directed according to the same axes.

The axial deformations of each cylindrical body cause a change in the length of the optical fibre wound around it. In particular, the compression of the cylindrical body results in its simultaneous lateral expansion, which is accompanied by the elongation of the optical fibre, while the contrary occurs in case of elongation of the cylindrical body.

By passing light through the optical fibre it is possible to detect the variation in the length of the optical fibre, for example by means of interferometric methods of the known type, and, consequently, to detect the amplitude of the vibration according to the axis of the respective cylindrical body.

Furthermore, as known in the art, the interferometer can be configured so as to give a net response only when the two cylindrical bodies in a pair undergo mutually opposite deformations, not when the same deformation occurs on both bodies.

The vector sensor described above has a good cross-axis rejection, since the movement of the proof mass along one of the three axes causes a very limited deformation of the optical fibre wound around the cylindrical bodies arranged orthogonally to said axis.

Furthermore, said limited deformation may be easily identified and separated from the deformation caused directly by a vibration signal directed along the axis of the pair of cylindrical bodies.

This is because, while a vibration directed along the axis of the pair of cylindrical bodies causes opposite deformations in the two cylindrical bodies, meaning the compression of one of them and the elongation of the other, a vibration directed along an axis perpendicular thereto causes the same deformation in both of the cylindrical bodies of the pair. Since the system measuring the deformations is configured to respond only to differential signals between the two bodies, no net signal will result.

Notwithstanding the said advantages, the geometry of the vibration sensor described above is such that it does not allow optimal exploitation of the space available in a borehole. While a borehole has a substantially cylindrical shape, said sensor has substantially the same overall dimensions in all directions, hence it is mostly suitable to be arranged in a spherical space.

This fact mainly affects the sensitivity that can be obtained from the sensor, which, as is known, is proportional to the overall dimensions of the same. It is evident, in fact, that the sensitivity of a vibration sensor of the type mentioned above depends on the deformation to which the optical fibre is subjected in response to a given vibration. As is known, said deformation depends on the length of the optical fibre wound around the cylindrical bodies, on the diameter of the cylindrical bodies themselves, and on the size of the proof mass.

A longer fibre, a larger-diameter cylindrical body, and a heavier mass, will result in higher sensitivity, but also in a larger sensor.

The vibration sensor of the type described above poses the further drawback that it does not distinguishes any rotational movements of the proof mass from the vibration movements according to the three axes. Therefore, said rotations may generate measurement errors.

SUMMARY OF THE INVENTION

The present invention intends to overcome all the drawbacks mentioned above related to the vibration sensors of the known type.

In particular, it is one object of the present invention to provide a vibration sensor that is more suited to be used in a borehole compared to a sensor of the known type described above.

More precisely, it is the object of the present invention to provide a vibration sensor that makes it possible to exploit the space available in a given borehole more effectively, offering higher sensitivity than the sensitivity that could be obtained by using a vibration sensor of the known type in the same borehole.

It is also the object of the present invention to provide a sensor having similar cross-axis rejection as that of a sensor of the known type.

Said objects are achieved by a vibration sensor constructed according to the main claim.

Further characteristics and details of the invention are illustrated in the corresponding dependent claims.

Advantageously, the greater sensitivity of the sensor that is the subject of the invention compared to a sensor of the known type makes it possible to obtain more accurate vibration measurements, assuming that they are used in boreholes having the same dimensions.

Still advantageously, the invention makes it possible to limit the diameter of the borehole to be dug in order to be able to accommodate a sensor with predetermined sensitivity.

BRIEF DESCRIPTION OF THE DRAWINGS

Said objects and advantages are highlighted in the description of some preferred embodiments of the invention, which are provided by way of non-limiting example with reference to the attached drawings, wherein.

DETAILED DESCRIPTION OF THE PREFERRED EMBODIMENTS

According to a first preferred embodiment of the invention, shown in Figures from 1 to 3, the vibration sensor 1 comprises a supporting structure 2 provided with a cavity 2a that accommodates a proof mass 3 that is smaller than the cavity 2a itself.

Figure 3:
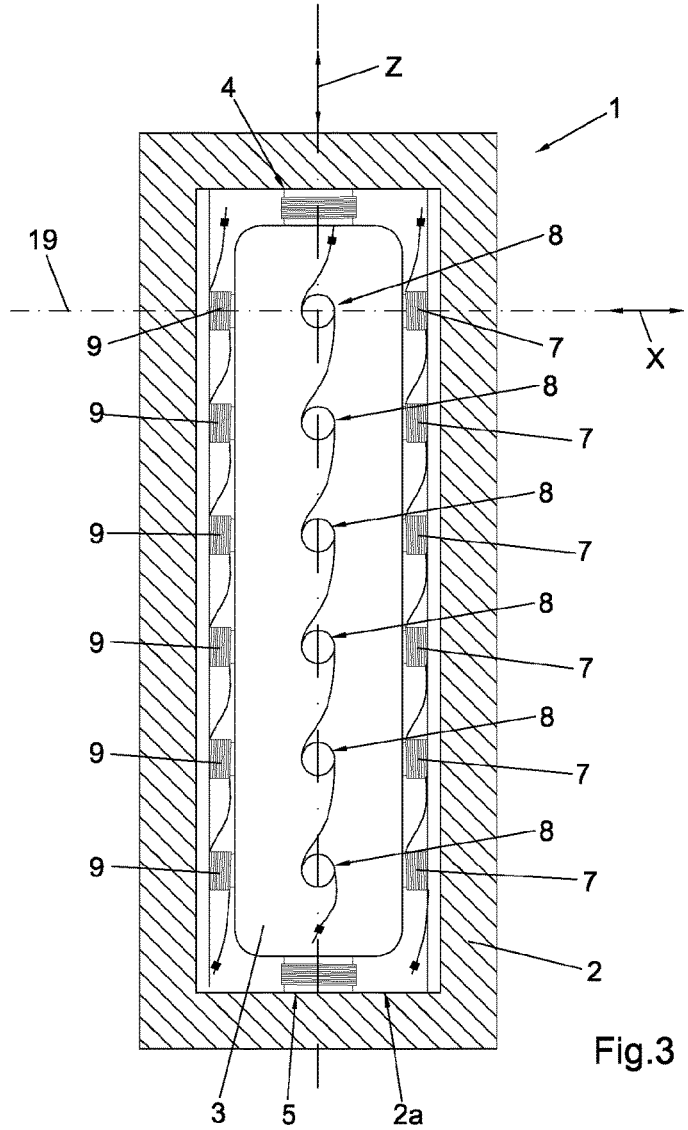
FIG. 3 shows a longitudinal section view of the sensor of FIG. 1.

Said proof mass 3 is suspended in the cavity 2a through the interposition of a plurality of elastic bodies 4, 5, 7, 8, 9, 10 that connect the proof mass 3 to the supporting structure 2 along corresponding connection axes 19 of which just one is indicated in FIG. 3 for the sake of clarity.

Preferably but not necessarily, each elastic body 4, 5, 7, 8, 9, 10 has a cylindrical shape whose axis defines the corresponding connection axis 19.

Still preferably, each elastic body 4, 5, 7, 8, 9, 10 is made of rubber.

In variant embodiments of the invention, rubber may be replaced by any other equivalent material of known type.

An optical fibre portion 11 is in contact with each elastic body 4, 5, 7, 8, 9, 10, more precisely, it is wound around the corresponding connection axis 19. In particular, each optical fibre portion 11 defines a coil with a predetermined number of turns.

The length of this optical fibre portion 11 can be measured using well known optical techniques. Preferably, an interferometric technique is used for maximum sensitivity, but other techniques known in the art may also be used, such as measuring the wavelength shift of a long, and preferably π-shifted, fibre Bragg-grating formed within the fibre portion 11, or measuring changes in the polarization state of the light in the fibre.

The proof mass 3 has elongated shape according to a main reference direction Z and, preferably, it has a prismatic shape along said direction, for example a bar-like or rod-like shape.

Figure 1:
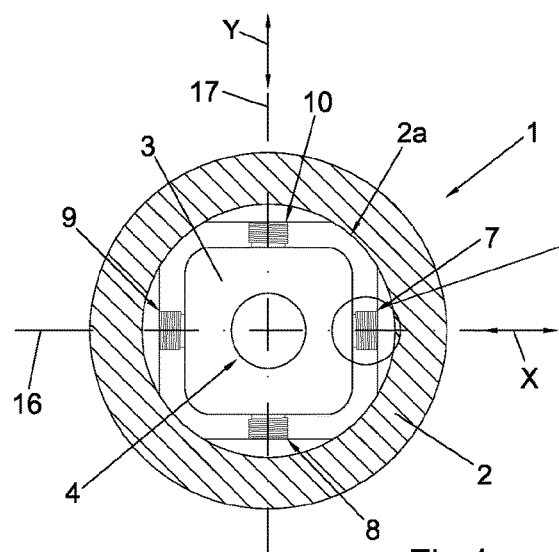
FIG. 1 shows a cross-sectional view of a first embodiment of the vibration sensor of the invention.
Figure 2:
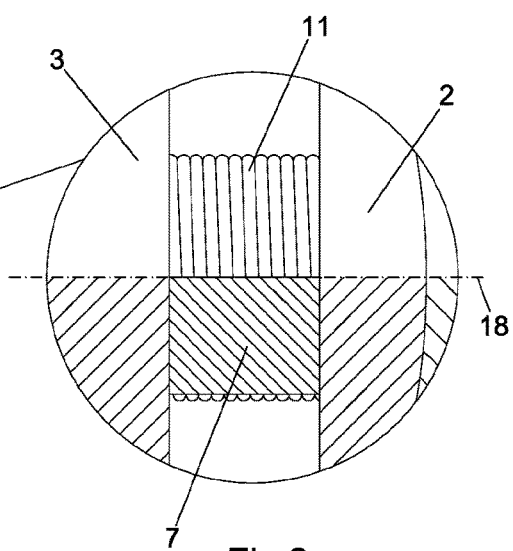
FIG. 2 shows an enlarged and partially sectioned detail of FIG. 1.

Preferably, and as shown in FIG. 1, the proof mass 3 develops according to said main reference direction Z with a substantially square cross section.

According to a variant embodiment of the invention not shown in the drawings, the proof mass 3 develops according to the main reference direction Z with a substantially circular cross section.

In any case, the cavity 2a and, consequently, the supporting structure 2 are also elongated according to said main reference direction Z, and preferably they have generally cylindrical shapes.

It can be understood that the vibration sensor 1 with elongated shape as described above allows a more efficient exploitation of the space available in a borehole than allowed by a vibration sensor 1 of the known type having substantially the same overall dimensions in the three dimensions.

As shown in FIG. 3, the plurality of elastic bodies 4, 5, 7, 8, 9, 10 comprises two or more first elastic bodies 7 which are spaced along the main reference direction Z and are arranged so that they are all caused to be simultaneously compressed along their corresponding connection axes 19 following a displacement of the proof mass 3 in a first reference direction X perpendicular to the main reference direction Z, and simultaneously stretched along their corresponding connection axes 19 following a displacement of the proof mass 3 in a direction opposite the first reference direction X.

In other words, all the first elastic bodies 7 are arranged, with respect to the proof mass 3, on the same side with respect to a plane which is parallel to the main reference direction Z, is orthogonal to the first reference direction X, and intersects the proof mass 3.

Hereinafter, the above first elastic bodies 7 on the whole will be sometimes referred to as a "group" of elastic bodies, and the group will be identified using the same number as the elastic bodies which constitute it. The same applies to other groups of elastic bodies that will be defined later.

It is noticed that the above first reference direction X implicitly incorporates also an orientation, namely the orientation corresponding to the compression of the first elastic bodies 7. The same applies to the further reference directions defined hereinafter, as it will be apparent in the following.

It can be understood that the first elastic bodies 7 render the vibration sensor 1 capable to detect vibrations according to the first reference direction X in a way that is completely analogous to that allowed by a vibration sensor of the known type described above, thus offering the same advantages.

However, in the vibration sensor 1 of the invention, the presence of a plurality of first elastic bodies 7 capable of detecting the vibration signals along the first reference direction X makes it possible to multiply the overall length of the respective optical fibre 11 intended to be used for detecting the vibration that propagates along said first reference direction X.

In particular, the greater length of the optical fibre 11 is obtained without increasing the length or diameter of the first elastic bodies 7 and, therefore, without increasing the overall dimensions of the vibration sensor 1 along the first reference direction X, thus increasing the dimension only along the main reference direction Z, which, however, is compatible with the use of the sensor 1 in a borehole.

Therefore, it can be understood that the above mentioned vibration sensor 1, though being suited to be used in boreholes, offers high measurement sensitivity also in directions that are orthogonal to the direction of the borehole itself, which thus makes it possible to achieve one of the objects of the invention.

In particular, said sensor 1 offers higher sensitivity compared to the sensitivity that can be achieved by a sensor according to the known art having the same overall diameter.

Advantageously, the presence of several first elastic bodies 7 makes it possible to limit the effect of undesired rotations of the proof mass 3 about a direction perpendicular to the main reference direction Z, thus reducing disturbances induced by said rotations.

The first reference direction X can be so defined as to be parallel to the vectorial sum of a plurality of vectors having, respectively, the same directions of the connection axes 19 of the first elastic bodies 7 and being oriented towards the proof mass 3. The above definition is applicable to both the cases where the first elastic bodies 7 have parallel and non-parallel connection axes 19. The above definition is also applicable to the further reference directions which will be defined in the following.

Nevertheless, the present description also applies if a different definition for the first and the further reference directions was used.

Preferably, the plurality of elastic bodies 4, 5, 7, 8, 9, 10 comprises also two or more second elastic bodies 8 which are spaced along the main reference direction Z and are arranged so that they are all caused to be simultaneously compressed along their corresponding connection axes 19 following a displacement of the proof mass 3 in a second reference direction Y perpendicular to both the main reference direction Z and the first reference direction X, and to be simultaneously stretched along their corresponding connection axes 19 following a displacement of the proof mass 3 in a direction opposite the second reference direction Y.

Advantageously, the presence of said second elastic bodies 8 in addition to the first elastic bodies 7 makes it possible to measure the vibrations that are directed according to either two mutually orthogonal directions of reference.

Preferably, the plurality of elastic bodies comprises also one or more third elastic bodies 9, which are spaced along the main reference direction Z and are arranged so that they are all caused to be simultaneously stretched along their corresponding connection axes 19 following a displacement of the proof mass 3 in the first reference direction X, i.e., in the direction corresponding to the compression of all of the first elastic bodies 7, and simultaneously compressed along their corresponding connection axes 19 following a displacement of the proof mass 3 in a direction opposite the first reference direction X.

In other words, the first elastic bodies 7 and the third elastic bodies 9 are arranged on respective opposite sides of the proof mass 3 according to the first reference direction X.

Advantageously, the above third elastic bodies 9 can be used together with the first elastic bodies 7 in a differential configuration to distinguish the measurement signals produced by a vibration along the first reference direction X from the interfering signals resulting from vibrations directed crosswise with respect to said direction, according to the principle described above.

Preferably, each first elastic body 7 can be paired to a corresponding third elastic body 9, the two elastic bodies in the pair being substantially identical and having collinear connection axes 19. Advantageously, this arrangement facilitates the elimination of the signals induced by vibrations that propagate crosswise with respect to the connection axes 19 of the elastic bodies of each pair, since the use of substantially identical pairs will result in crosswise vibrations producing substantially similar interfering signals in the elastic bodies forming each half of a pair, which can then be cancelled out by operating the pair in a differential configuration, according to the principle already mentioned above.

Preferably, the plurality of elastic bodies comprises also one or more fourth elastic bodies 10, which are spaced along the main reference direction Z and are arranged so that they are all caused to be simultaneously stretched along their corresponding connection axes 19 following a displacement of the proof mass 3 in the second reference direction Y, i.e., in the direction corresponding to the compression of all of the second elastic bodies 8, and simultaneously compressed along their corresponding connection axes 19 following a displacement of the proof mass 3 in a direction opposite the second reference direction Y.

In other words, the second elastic bodies 8 and the fourth elastic bodies 10 are arranged on respective opposite sides of the proof mass 3 according to the second reference direction Y.

The second elastic bodies 8 and the fourth elastic bodies 10 can have the same relation, and bring the same advantages, as that above mentioned for the first elastic bodies 7 and the third elastic bodies 9.

Preferably, the plurality of elastic bodies comprises also a fifth elastic body 4 arranged with its corresponding connection axis 19 parallel to the main reference direction Z, in such a way as to connect one end of the proof mass 3 to the corresponding end of the cavity 2a.

Advantageously, the above fifth elastic body 4, in addition to the first and second elastic bodies 7, 8, makes it possible to obtain a triaxial vector sensor, i.e., a sensor which is capable of resolving any vibration into three spatial components, namely the first reference direction X, the second reference direction Y, and the main reference direction Z.

Preferably, the plurality of elastic bodies comprises also a sixth elastic body 5 with the respective connection axis 19 parallel to the main reference direction Z and opposite the fifth elastic body 4 with respect to the proof mass 3 along said main reference direction.

The fifth elastic body 4 and the sixth elastic body 5 can have the same relation, and bring the same advantages, as that above mentioned for the first elastic bodies 7 and the third elastic bodies 9.

Preferably, the connection axis 19 of each first elastic body 7 forms an angle smaller than 45° with the first reference direction X on a plane orthogonal with the main reference direction Z.

With the configuration just mentioned, the main component of the response of each first elastic body 7 is directed according to the first reference direction X, to the benefit of the overall response of the sensor 1 according to the said direction. Evidently, this benefit enhances as the angle above mentioned decreases to zero.

More preferably, the above connection axes 19 are all parallel to, and preferably lying on, a corresponding common reference plane.

The same features as above disclosed for the first elastic bodies 7 preferably apply to either the second elastic bodies 8, the third elastic bodies 9, and the fourth elastic bodies 10, for which corresponding common reference planes can be defined.

Furthermore, preferably, all the connection axes 19 of the first elastic bodies 7 and of the third elastic bodies 9 lie on a common first reference plane 16, while all the connection axes 19 of the second elastic bodies 8 and of the fourth elastic bodies 10 lie on a corresponding common second reference plane 17.

Figure 4:
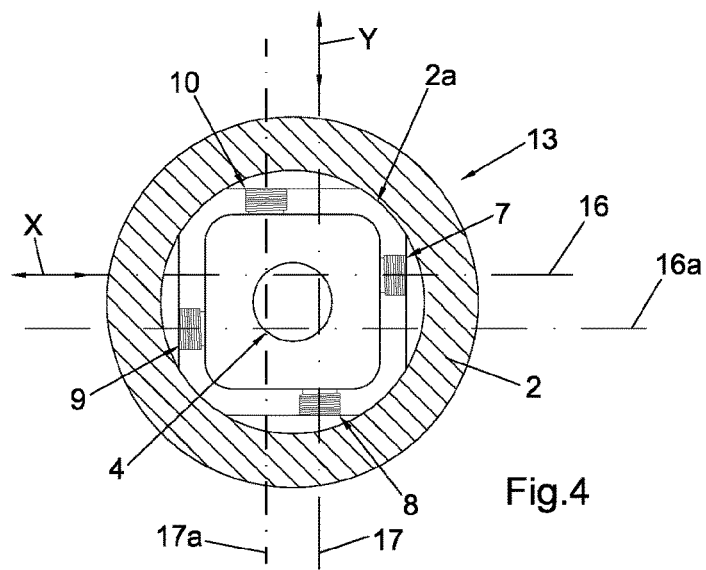
FIGS. 4 and 5 show respectively a cross-sectional view and a longitudinal section view of a second embodiment of the sensor of the invention.
Figure 5:
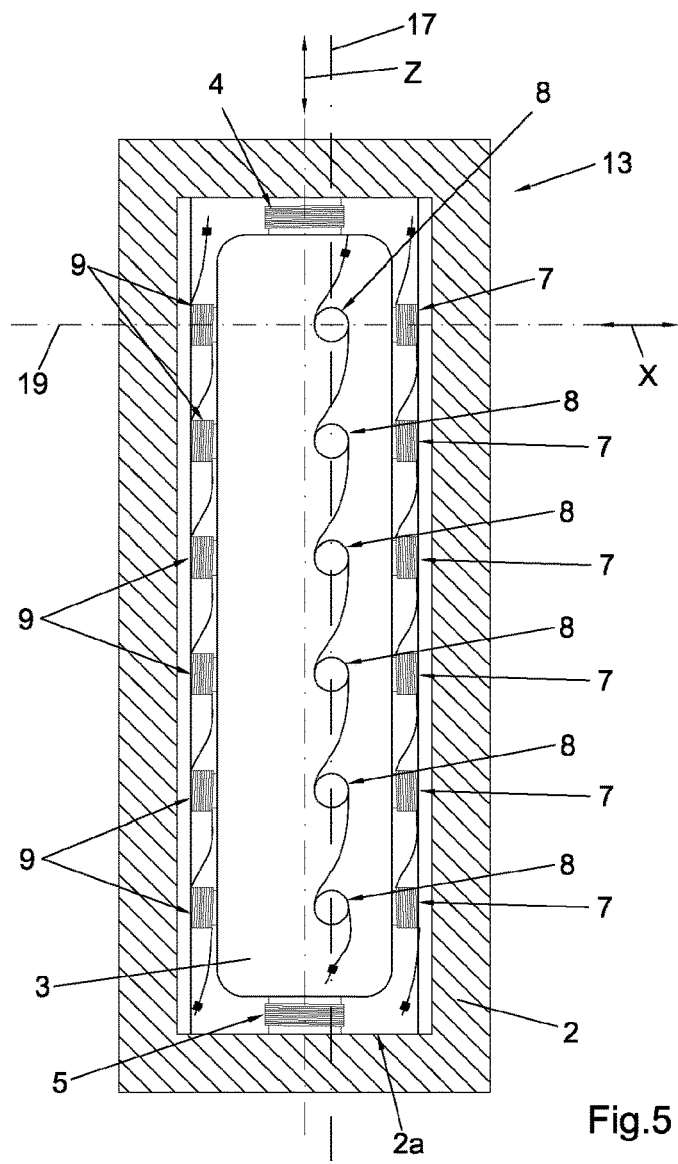

According to a second embodiment of the invention, illustrated in FIGS. 4 and 5, the sensor indicated therein by 13 differs from the previous embodiment in that the first, second, third and fourth elastic bodies 7, 8, 9 and 10 are arranged in such a way that they are all compressed following the rotation of the proof mass 3 around the main reference direction Z, and are all elongated following the rotation of the proof mass 3 in the opposite direction.

Preferably, said configuration is achieved by arranging the first elastic bodies 7 so that all of their connection axes 19 are substantially parallel and lie in a first reference plane 16 parallel to the main reference direction Z but offset from it, and by arranging the third elastic bodies 9 so that all of their connection axes 19 are substantially parallel and lie in a second reference plane 16a which is parallel to the first reference plane 16 and offset from it, the first reference plane 16 and second reference plane 16a being arranged on corresponding opposite sides of the main reference direction Z. The same applies mutatis-mutandis for the second elastic bodies 8 and the fourth elastic bodies 10.

Advantageously, said configuration makes it possible to increase the stability of the proof mass 3 around the main reference direction Z, limiting its rotation around said direction so as to prevent corresponding measurement errors.

Also advantageously, any residual signals introduced into the groups of elastic bodies 7, 8, 9, 10 by the above rotations are cancelled when these groups are operated as differential pairs, as discussed above.

Figure 6:
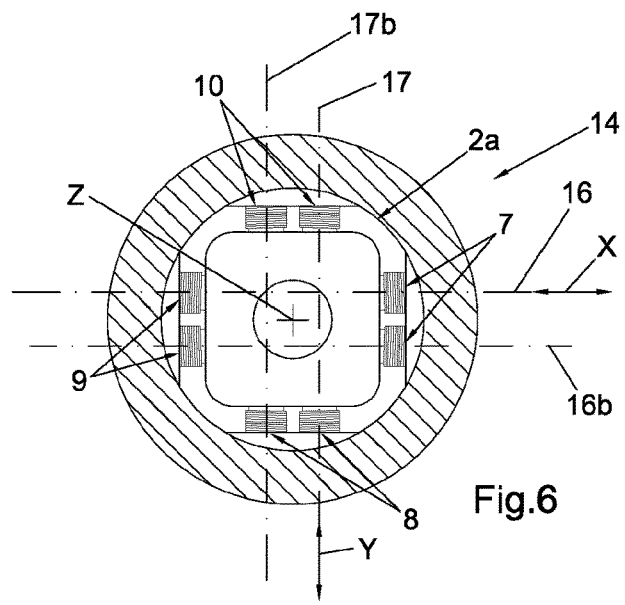
FIGS. 6 and 7 show respectively a cross-sectional view and a longitudinal section view of a third embodiment of the sensor of the invention.
Figure 7:
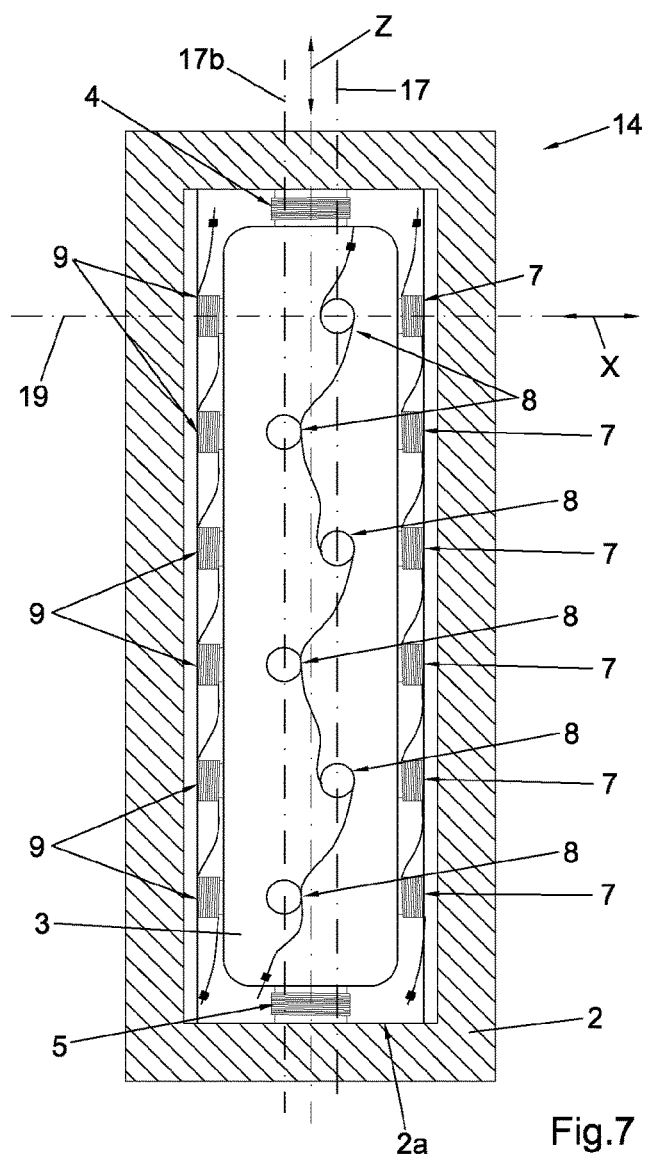

According to a third embodiment of the invention, illustrated in FIGS. 6 and 7, the advantage described above is achieved through a different arrangement of the elastic bodies 7, 8, 9, 10, in which the first elastic bodies 7 have their corresponding connection axes 19 substantially parallel to each other but lying on two or more different reference planes, the same being applicable to either the second, third and fourth elastic bodies 8, 9, 10. Preferably, the first and third elastic bodies 7 and 9 have connection axes 19 that are arranged so as to be offset on two parallel planes 16 and 16b, while the second and fourth elastic bodies 8 and 10 have connection axes 19 that are arranged so as to be offset on two parallel planes 17 and 17b.

Preferably, the two planes 16 and 16b are symmetrical with respect to the longitudinal axis of the proof mass 3, and so are the two planes 17 and 17b.

Figure 8:
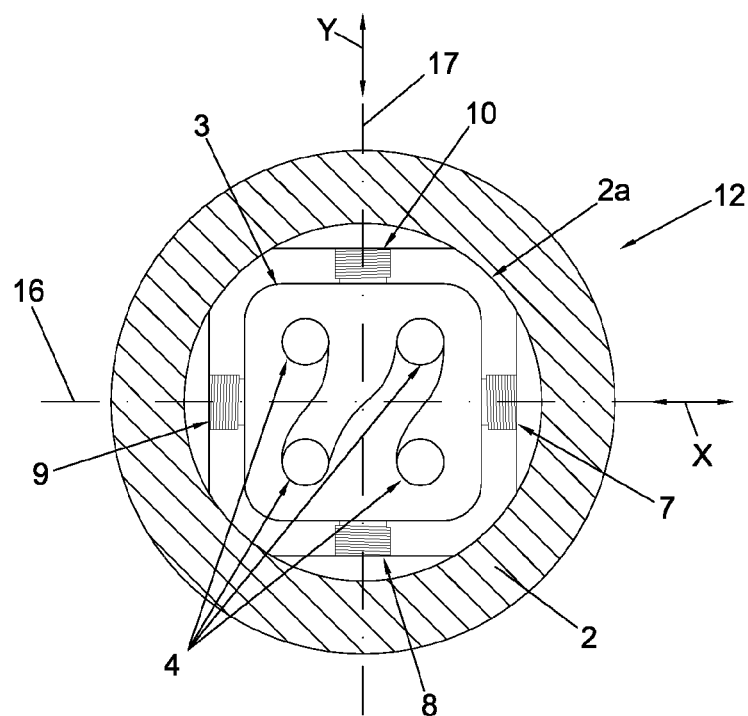
FIG. 8 shows a cross-sectional view of a fourth embodiment of the sensor of the invention.

In a fourth embodiment of the invention, represented in FIG. 8, the sensor indicated therein by 12 comprises a plurality of fifth elastic bodies 4 and/or of sixth elastic bodies 5. This configuration makes it possible to increase the total length of fibre 11 which can be wound around the bodies 4 and/or 5, thus increasing the sensor's sensitivity, without increasing the sensor's dimension along the main reference direction Z.

In all of the embodiments of the invention described above, the elastic bodies are arranged substantially parallel to three mutually orthogonal directions of reference X, Y, Z.

Figure 9:
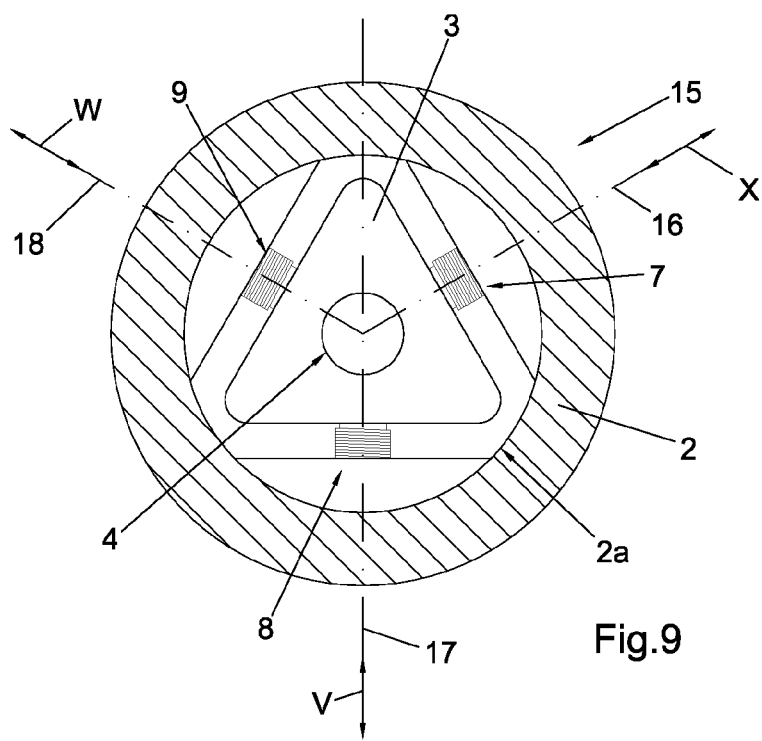
FIG. 9 shows a cross-sectional view of a fifth embodiment of the sensor of the invention.

A fifth embodiment of the invention, represented in FIG. 9, envisages a vibration sensor indicated therein by 15 in which the first, second and third elastic bodies 7, 8, 9 have respective reference directions X, V, W mutually forming angles different from 90° and, preferably, substantially equal to 120°.

Preferably, the first elastic bodies 7 have their respective connection axes 19 that are all parallel to, and preferably arranged on, a common first reference plane 16, the second elastic bodies 8 have their respective connection axes 19 that are all parallel to, and preferably arranged on, a common second reference plane 17, and the third elastic bodies 9 have their respective connection axes 19 that are all parallel to, and preferably arranged on, a common third reference plane 18, wherein each one of the first, second and third reference planes 16, 17, 18 is parallel to said main reference direction Z and to the corresponding reference directions X, V, W.

Advantageously, said sensor 15 has reduced overall transverse dimensions, and uses fewer components, compared to the previous embodiments, even though it offers good stability of the proof mass 3 crosswise with respect to the main reference direction Z.

In the latter embodiment, the vibration signals detected according to the three directions X, V, W can be processed by means of an electronic device and/or software suited to resolve the components of the vibration according to two mutually orthogonal directions and also to calculate a signal dependent on the rotation of the proof mass 3 about the reference direction Z independent of any translation in the X, V or W reference directions.

In all of the embodiments described above, the optical fibre portions 11 of the first elastic bodies 7 are connected to one another in such a way as to form a single fibre. The same applies to either the second, third and fourth elastic bodies 8, 9, 10. Advantageously, this makes it possible to obtain a single signal for each reference direction X, Y, Z, V, W, thus reducing the complexity of the device.

Another aspect of the invention concerns optical rejection of signals which are identical in each of the opposing groups of elastic bodies 7, 8, 9, 10 lying along a common reference axis. These common-mode signals result from cross-axis motion of the proof mass 3, i.e., motion perpendicular to the common axis, or from other interfering sources such as thermal effects and/or mass rotation.

Advantageously, this aspect improves the accuracy of the sensor as above defined, as well as of any sensor comprising two elastic bodies having respective connection axes 19 aligned according to a common reference axis.

Figure 10:
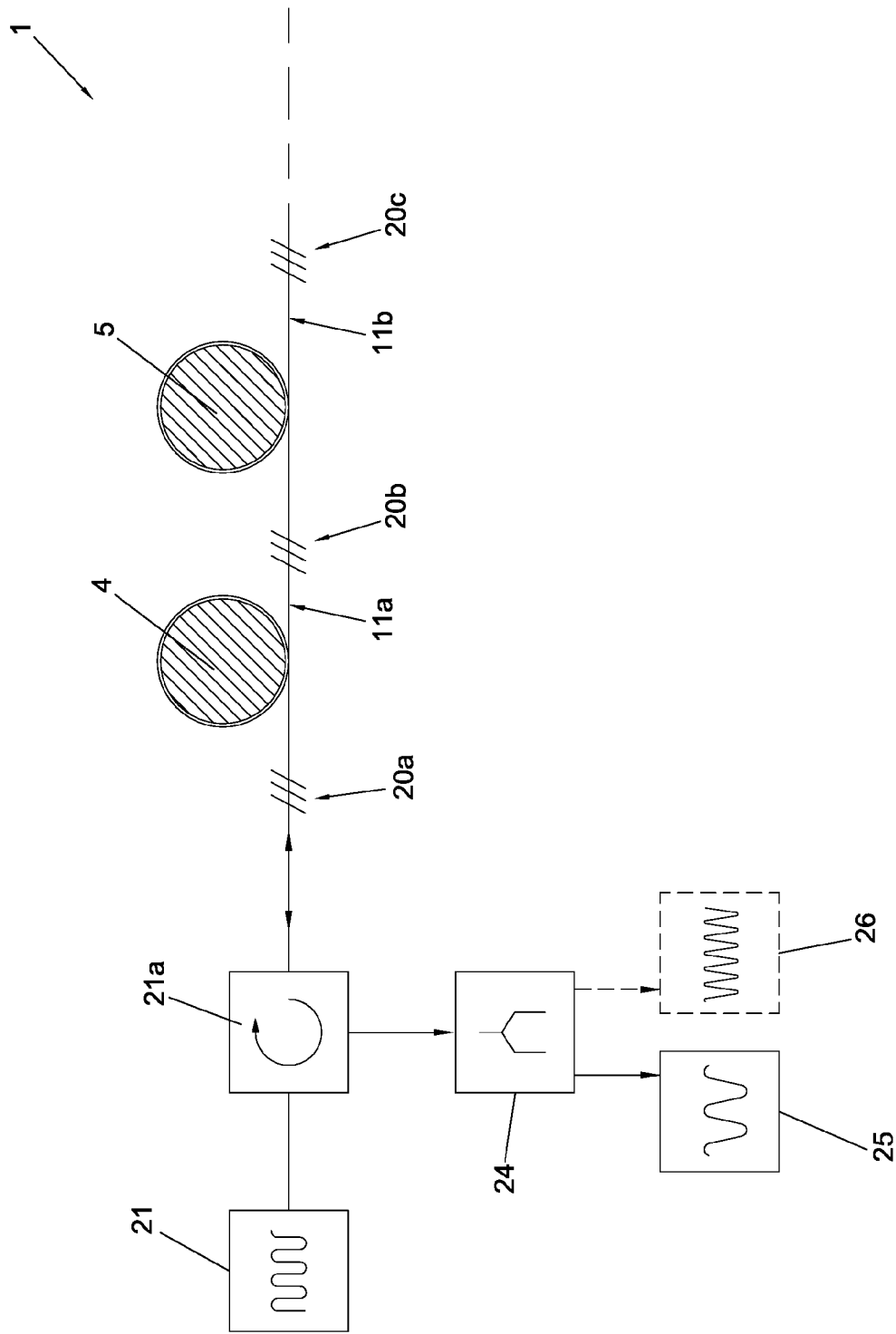
FIG. 10 schematically shows a part of the sensor of the invention, in operating configuration.

The above aspect, schematically represented in FIG. 10, extends the known interferometric method for measuring changes in the length of the fibre by connecting in series the optical fiber portions 11a and 11b, respectively wound around the two elastic bodies 4, 5 arranged on opposite sides with respect to the proof mass 3, and having connection axes 19 aligned according to a common axis parallel to the reference direction Z. The two optical fiber portions 11a and 11b have substantially the same length. Obviously, the above configuration can be used on another reference direction X, Y, by connecting the optical fiber portions 11 wound around a pair of elastic bodies arranged on opposite sides with respect to the proof mass 3 and aligned according to a common axis parallel to the said reference direction.

The system also comprises three partially-reflecting elements 20a, 20b, 20c, suited to reflect overlapping ranges of wavelengths. A first and a second of these partially-reflecting elements 20a and 20c are arranged at the free ends of optical fiber portions 11a and 11b respectively, and a third partially-reflecting element 20b is arranged at the connection point between the optical fiber portions 11a and 11b. Preferably but not necessarily, the partially-reflecting elements are fibre Bragg-gratings.

To obtain a measurement of the vibration signal using the above disclosed configuration, a light source 21 emits an optical signal which passes through an optical circulator 21a and is then coupled to one end of e.g., the optical fiber portion 11a wound around elastic body 4. The optical signal reflected by partially-reflecting elements 20a, 20b and 20c is separated from the incoming light from the light source 21 by the optical circulator 21a and two portions of it which have been reflected in different ways by the above partially-reflecting elements 20a, 20b, 20c are selected and compared interferometrically.

In particular, a comparison is made between the signal portion which is reflected twice by the partially-reflecting element 20b and once by the partially-reflecting element 20a within the optical fiber portion 11a, thus having traveled this portion four times, and the signal portion which travels both ways the overall length of the two optical fiber portions 11a and 11b, thus having been reflected only once by the partially-reflecting element 20c.

The above comparison can be made e.g., by ensuring that the light reflected by the partially reflecting elements has a coherence length less than the lengths of optical fiber portions 11a, 11b, but also greater than any residual difference in length between the two portions 11a, 11b so that the two signal portions referred to above are the only two mutually-coherent portions at the system's output.

Since the above optical fiber portions 11a, 11b have the same length, any cross axis motion of the proof mass 3 will stretch them by an equal amount, resulting in no net optical path difference, hence no net interference signal, between the two reflections. Therefore, this configuration allows for the optical rejection of cross-axis signals in relation to direction Z.

Evidently, the same effect as above can be achieved by comparing any two signal portions, provided one portion travels through only one of the elastic bodies, that the other portion travels through both elastic bodies, and that both portions travel substantially the same overall distances along the optical fiber.

Preferably, the above system is used to detect the vibration signals from more than one pair of opposed elastic bodies. In this case, the optical fiber corresponding to each further pair is connected in series to the above optical fiber portions 11a, 11b of the first pair. The responses of the two pairs can be mutually distinguished using respectively different wavelength channels, which can be separated by means of a wavelength splitter 24 and detected through respective detectors 25, 26.

The above configuration has the advantage of requiring only one wavelength channel for each pair of elastic bodies, i.e., only one corresponding wavelength detector, rather than two, i.e., one for each elastic body within each pair, as in the prior art of wavelength-multiplexed systems. At the same time, because of the ability to average the signal continuously, this configuration reduces the noise compared with a time-multiplexed system, based on optical signals in the form of pulses, wherein the reflection delay allows the signals corresponding to the different elastic bodies to be distinguished.

Also advantageously, because the differential measurement in the elastic body pair is made directly in the optical domain, there is no need for accurate matching of the signals from the two elastic bodies in electronics and/or software before subtraction, as required in the known systems.

Figure 11:
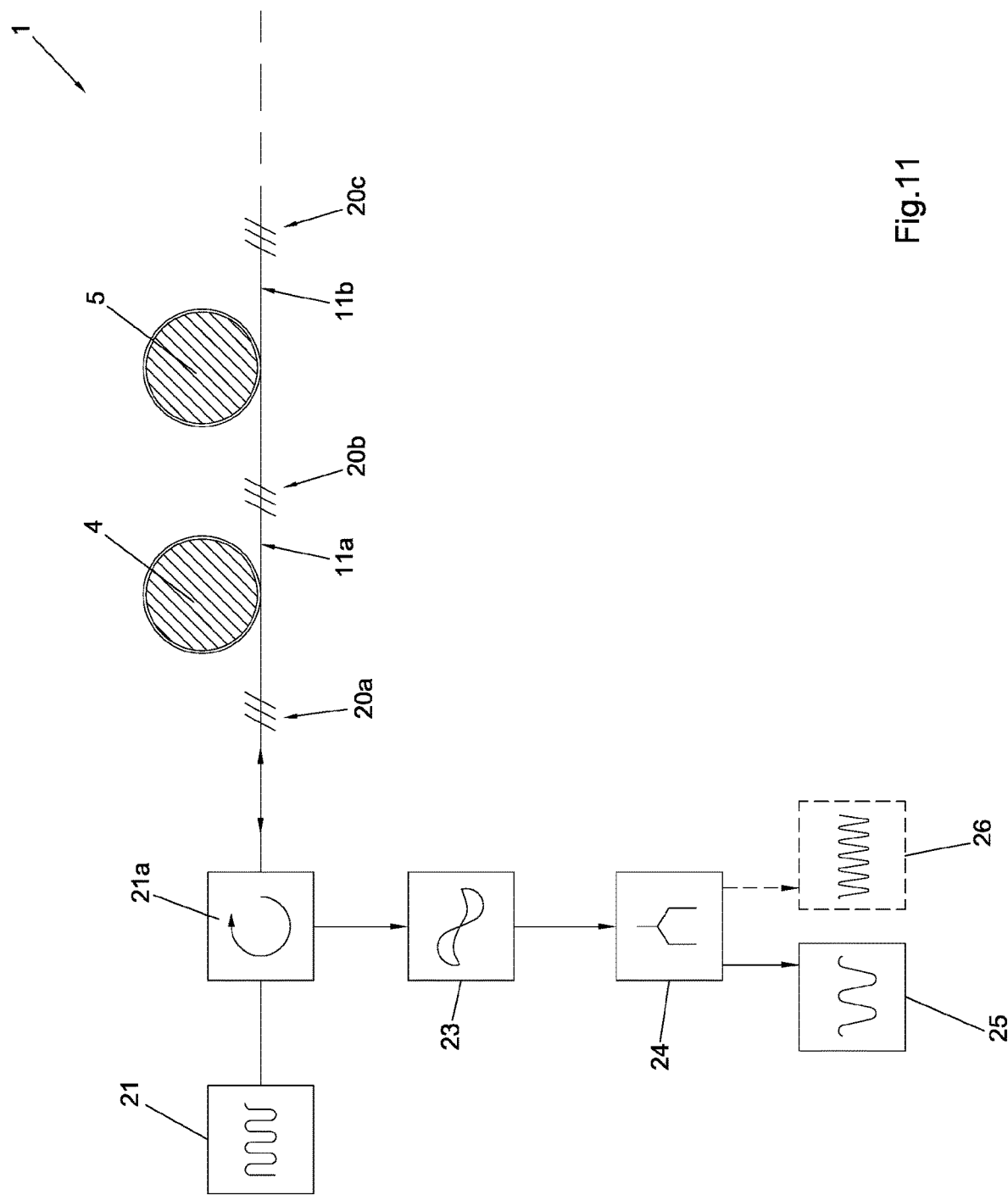
FIG. 11 schematically shows a part of the sensor of the invention according to a different embodiment, in operating configuration.

In a variant embodiment represented in FIG. 11, an additional path length, greater than the coherence length of the light reflected by the partially-reflecting elements, is inserted into one of the optical fiber portions 11a, 11b, which is matched by a compensating interferometer 23 and allows the latter to introduce a modulation signal into the optical system. This modulation signal allows the phase of the interferometer to be continuously and unambiguously tracked using a phase generated carrier technique, or by other means know in the art, such as phase-stepping or optical frequency shifting. By tracking the phase continuously, problems of phase bias and phase ambiguity which would otherwise be present in the simpler scheme described above are avoided.

Clearly, the above disclosed vibration sensor achieves the objects of the invention.

In particular, the use of an elongated proof mass makes the sensor particularly suited to be used in boreholes. At the same time, the presence of a plurality of elastic bodies arranged in different positions along the longitudinal axis of the proof mass makes it possible to obtain from said sensor performance levels that are analogous to those offered by a sensor of the known type.

Also, the use of direct optical cancellation of common-mode signals results in high cross-axis rejection without using additional wavelength channels.

The invention claimed is:
1. A vibration sensor comprising:
a supporting structure provided with a cavity;
a proof mass accommodated in said cavity, said proof mass having an elongated shape such that a longitudinal dimension of said proof mass is parallel to a main reference direction (Z);
a plurality of elastic bodies, each connecting said proof mass to said supporting structure along a corresponding connection axis;
a plurality of optical fibre portions, each of said plurality of optical fibre portions being arranged in contact with one elastic body from said plurality of elastic bodies and wound around the corresponding connection axis;
wherein said plurality of elastic bodies comprises two or more first elastic bodies which are spaced along said main reference direction (Z) and all arranged on a first side of said proof mass with respect to a first plane, said first plane being:
parallel to said main reference direction (Z), orthogonal to a first reference direction (X) perpendicular to said main reference direction (Z), and
intersecting said proof mass between said first side and a second side of the proof mass,
such that said two or more first elastic bodies are all caused to be simultaneously compressed along their corresponding connection axes following a displacement of said proof mass in the first reference direction (X), and simultaneously stretched along their corresponding connection axes following a displacement of said proof mass in a direction opposite said first reference direction (X),
wherein each of said plurality of optical fibre portions arranged in contact with one of said two or more first elastic bodies are connected to form a single fibre.

2. The vibration sensor according to claim 1, wherein said two or more first elastic bodies have their respective connection axes all lying on a common reference plane.

3. The vibration sensor according to claim 1, wherein said two or more first elastic bodies have the corresponding connection axes all lying on at least two different reference planes.

4. The vibration sensor according to claim 1, wherein the connection axis of each one of said two or more first elastic bodies forms an angle smaller than 45° with said first reference direction (X) on a plane orthogonal with said main reference direction (Z).

5. The vibration sensor according to claim 1, wherein said plurality of elastic bodies comprises two or more second elastic bodies which are spaced along said main reference direction (Z) and are arranged so that they are all caused to be simultaneously compressed along their corresponding connection axes following a displacement of said proof mass in a second reference direction (Y) perpendicular to said main reference direction (Z) and to said first reference direction (X), and simultaneously stretched along their corresponding connection axes following a displacement of said proof mass in a direction opposite said second reference direction.

6. The vibration sensor according to claim 1, wherein said plurality of elastic bodies comprises two or more third elastic bodies which are spaced along said main reference direction (Z), and are arranged so that they are all caused to be simultaneously stretched along their corresponding connection axis following a displacement of said proof mass in said first reference direction (X), and simultaneously compressed along their corresponding connection axes following a displacement of said proof mass in a direction opposite said first reference direction.

7. The vibration sensor according to claim 6, wherein said two or more first elastic bodies and said two or more third elastic bodies have their respective connection axes that are all arranged on a common reference plane.

8. The vibration sensor according to claim 6, wherein said two or more first elastic bodies and said two or more third elastic bodies are arranged in such a way that they are all compressed or all stretched following a corresponding rotation of said proof mass around said main reference direction (Z).

9. The vibration sensor according to claim 6, wherein:
said two or more first elastic bodies have their respective connection axes that are all parallel to a common first reference plane;
said two or more second elastic bodies have their respective connection axes that are all parallel to a common second reference plane;
said two or more third elastic bodies have their respective connection axes that are all parallel to a common third reference plane;
each one of said first, second and third reference planes is parallel on said main reference direction (Z) and forms an angle of 120° with respect to each of the other two planes.

10. The vibration sensor according to claim 1, wherein said plurality of elastic bodies comprises a fifth elastic body arranged with the respective connection axis parallel to said main reference direction (Z).

11. The vibration sensor according to claim 10, further comprising a plurality of said fifth elastic bodies, all arranged on the same side with respect to said proof mass according to said main reference direction (Z).

12. The vibration sensor according to claim 10, wherein said plurality of elastic bodies comprises a sixth elastic body arranged opposite to said fifth elastic body with respect to said proof mass according to said main reference direction (Z).

13. The vibration sensor according to claim 1, wherein each elastic body of said plurality of elastic bodies is made in a compliant material.

14. The vibration sensor according to claim 1, wherein two of said plurality of optical fibre portions, corresponding to two of said plurality of elastic bodies having corresponding connection axes mutually aligned and being arranged on opposite sides of said proof mass, are mutually connected in series, wherein said vibration sensor further comprises three partially-reflecting elements configured to reflect overlapping wavelength ranges, two of said partially-reflecting elements being arranged at a free end of each one of said two of said plurality of optical fibre portions and a third one of said partially-reflecting elements being arranged at a connection point between said two of said plurality of optical fibre portions.

15. The vibration sensor according to claim 14, wherein the vibration sensor is configured for comparing a first optical signal portion reflected by said partially-reflecting elements such that the first optical signal only travels within a first one of said two of said plurality of optical fibre portions with a second optical signal portion reflected by said partially-reflecting elements after traveling both of said two of said plurality of optical fibre portions, wherein both said first optical signal portion and said second optical signal portion originate from a common light source.

16. The vibration sensor according to claim 15, wherein said two of said plurality of optical fibre portions and said partially-reflecting elements are configured such that a total optical distance travelled by said first and second signal portions differs by less than a coherence length of the light reflected by the partially-reflecting elements.

17. The vibration sensor according to claim 16, wherein said light source has coherence length less than the lengths of said optical fibre portions.

18. The vibration sensor according to claim 15, wherein said two of said plurality of optical fibre portions and said partially-reflecting elements are configured such that a total optical distance travelled by said first and second signal portions differs by an amount greater than a coherence length of the light reflected by said partially-reflecting elements.

19. The vibration sensor according to claim 18, wherein the vibration sensor comprises a compensating interferometer, configured to bring said first and second signal portions back into coherence and to produce an interferometric output.

20. The vibration sensor according to claim 14, wherein said partially-reflecting elements are fibre Bragg-gratings.

21. A method for using a vibration sensor according to claim 14, comprises the following steps:
    injecting an optical signal through the free end of a first one of said two of said plurality of optical fibre portions, said optical signal comprising said wavelength ranges;
    detecting, at said free end of said first optical fibre portion, said optical signal after having been reflected by said partially-reflecting elements;
    selecting a first signal portion belonging to a part of said detected optical signal which remained confined within said first optical fibre portion;
    selecting a second signal portion belonging to a part of said detected optical signal which travelled along both of said two of said plurality of optical fibre portions;
    calculating an interference signal by comparing said first signal portion with said second signal portion.

22. The method according to claim 21, wherein said first signal portion belongs to the part of said detected optical signal which has travelled along said first optical fibre portion at least four times.

23. A vibration sensor comprising:
    a supporting structure provided with a cavity;
    a proof mass accommodated in said cavity;
    a plurality of elastic bodies, each connecting said proof mass to said supporting structure along a corresponding connection axis;
    a plurality of optical fibre portions, each of said plurality of optical fibre portions being arranged in contact with one elastic body from said plurality of elastic bodies and wound around the corresponding connection axis;

wherein said proof mass has an elongated shape according to a main reference direction ($Z$), and further characterized in that said plurality of elastic bodies comprises two or more first elastic bodies which are spaced along said main reference direction ($Z$) and are arranged so that they are all caused to be simultaneously compressed along their corresponding connection axes following a displacement of said proof mass in a first reference direction ($X$) perpendicular to said main reference direction ($Z$), and simultaneously stretched along their corresponding connection axes following a displacement of said proof mass in a direction opposite said first reference direction ($X$), wherein two of said plurality of optical fibre portions, corresponding to two of said plurality of elastic bodies having corresponding connection axes mutually aligned and being arranged on opposite sides of said proof mass, are mutually connected in series, wherein said vibration sensor further comprises three partially-reflecting elements configured to reflect overlapping wavelength ranges, two of said partially-reflecting elements being arranged at a free end of each one of said two of said plurality of optical fibre portions and a third one of said partially-reflecting elements being arranged at a connection point between said two of said plurality of optical fibre portions.

* * * * *